United States Patent [19]
Vetelainen et al.

(10) Patent No.: US 7,627,349 B2
(45) Date of Patent: Dec. 1, 2009

(54) ALTERNATIVE NOTIFIER FOR MULTIMEDIA USE

(75) Inventors: Asko Vetelainen, Jääli (FI); Teemu Toropainen, Oulu (FI)

(73) Assignee: Nokia Corporation, Espoo (FI)

( * ) Notice: Subject to any disclaimer, the term of this patent is extended or adjusted under 35 U.S.C. 154(b) by 868 days.

(21) Appl. No.: 11/178,700

(22) Filed: Jul. 11, 2005

(65) Prior Publication Data

US 2007/0010292 A1 Jan. 11, 2007

(51) Int. Cl.
*H04B 1/38* (2006.01)
*H04M 1/00* (2006.01)

(52) U.S. Cl. .................. 455/566; 455/556.1; 455/557; 455/556.2; 455/550.1; 340/963; 340/968; 715/763; 715/963; 345/440

(58) Field of Classification Search .......... 455/566, 455/556.1, 557, 556.2, 550.1; 340/968, 963; 715/763, 963; 345/440
See application file for complete search history.

(56) References Cited

U.S. PATENT DOCUMENTS

| | | | | |
|---|---|---|---|---|
| 6,032,053 | A | 2/2000 | Schroeder et al. | 455/553 |
| 6,154,875 | A * | 11/2000 | Tanaka et al. | 717/107 |
| 6,427,078 | B1 * | 7/2002 | Wilska et al. | 455/550.1 |
| 6,459,906 | B1 | 10/2002 | Yang | 455/556 |
| 6,529,742 | B1 | 3/2003 | Yang | 455/556 |
| 6,781,635 | B1 * | 8/2004 | Takeda | 348/552 |
| 6,968,206 | B1 | 11/2005 | Whitsey-Anderson | 455/556.1 |
| 7,088,990 | B1 * | 8/2006 | Isomursu et al. | 455/412.1 |
| 7,139,014 | B1 * | 11/2006 | Kim et al. | 348/14.01 |
| 7,155,202 | B2 * | 12/2006 | Helal | 455/404.1 |
| 7,260,383 | B1 * | 8/2007 | Ngan | 455/412.1 |
| 7,310,416 | B1 * | 12/2007 | Henderson | 379/142.04 |
| 7,343,178 | B2 * | 3/2008 | Morishima | 455/566 |
| 7,366,529 | B2 * | 4/2008 | Alanara et al. | 455/466 |
| 7,373,395 | B2 * | 5/2008 | Brailean et al. | 709/219 |
| 7,386,323 | B2 * | 6/2008 | Chen et al. | 455/556.1 |
| 7,409,230 | B2 * | 8/2008 | Bae et al. | 455/566 |
| 7,433,672 | B2 * | 10/2008 | Wood | 455/404.1 |
| 7,454,000 | B1 * | 11/2008 | Henderson | 379/142.04 |
| 7,516,183 | B2 * | 4/2009 | Shiigi | 709/206 |
| 2004/0055011 | A1 | 3/2004 | Bae et al. | 725/62 |
| 2004/0056985 | A1 | 3/2004 | Seong | 348/838 |

FOREIGN PATENT DOCUMENTS

| | | |
|---|---|---|
| DE | 199 61 067 B4 | 6/2000 |
| EP | 0954150 A2 | 11/1999 |
| JP | 2004007144 A | 1/2004 |

\* cited by examiner

*Primary Examiner*—Marceau Milord
(74) *Attorney, Agent, or Firm*—Harrington & Smith, PC (57) ABSTRACT

A method for displaying data on a portable electronic device first displays graphical data on a graphical display. An event that is independent of the graphical data is received at the device. Responsive to the event, an event type is selected from a list that associates each of at least two event types with one of at least two display formats. A notifier of the event, in the selected format, is then displayed on the graphical display simultaneously with the graphical data. The formats are specific to the event types so that a user can decide whether to continue viewing the graphical data and not respond to the event notifier, or terminate the graphical data being displayed and respond to the event. Examples of events include an alarm from a locally stored user calendar, an incoming phone call, an SMS message, and an email. A computer program and a device are also detailed.

24 Claims, 4 Drawing Sheets

| EVENT TYPE | FORMAT | ADDITIONAL ATTRIBUTE | CROSS REFERENCE |
|---|---|---|---|
| INCOMING CALL | "CALLING PARTY NAME" "CALLING PARTY NUMBER" CALLING; OR UNKNOWN PARTY CALLING | FLASH WHEN ACTIVE | USER PHONE BOOK |
| ALARM | "USER SCHEDULED APPOINTMENT" | NONE | USER CALENDAR |
| SMS/IM MESSAGE | "SENDING PARTY": "TEXT OF MESSAGE" | LIMIT TO X CHARACTERS, AUTO-SCROLL IF MORE, FLASH FOR 7 SECONDS THEN STEADY | USER SMS CONTACT BOOK, SPECIFIC SMS MESSAGE |
| EMAIL/MMS | INCOMING EMAIL FROM "SENDING PARTY" | NONE | EMAIL HEADER |

FIG.3

ALTERNATIVE NOTIFIER FOR MULTIMEDIA USE

TECHNICAL FIELD

The present invention relates to wireless communication devices for receiving both video (television) and telephonic communications, including implementing software programs embodied on a computer readable media. It is particularly related to a graphical display interface of such a device.

BACKGROUND

Increasingly, portable electronic devices such as mobile phones are video-capable. Some mobile phones are equipped to receive digital television, some have a video-enabled camera, and some may have graphical computer gaming capability, possibly even games that are interactive in real time with compatible games on other mobile phones. However, video data demands a user's attention to a greater extent than many other mobile phone applications. Users purchase mobile phones to remain in contact with others, so in certain prior art solutions the mobile phone merely discontinued displaying the video data when there was an incoming call. Where the mobile phone is capable of other functions as well, such as accessing the Internet and serving as a personal digital assistant in storing a user's calendar of appointments, reminders, and phone book of contacts, there are a multitude of instances in which the user's attention may be taken away from the video data being displayed. However, the user is in the better position to determine whether to interrupt the display of video data and immediately respond to the incoming message, or continue viewing the video data and respond to the incoming message at a later and more convenient time. Terminating the display of video data upon every new incoming message is not seen as optimal from a mobile phone user's perspective, and becomes less so with increasing and varied functionality in mobile phones. The same is true when the user is recording (e.g., video and/or audio) or capturing/viewing a still photo.

What is needed in the art is a method and device by which a user is enabled to decide whether to continue the mobile phone doing some function that occupies the display screen (e.g., watching video data) and at least temporarily ignore an incoming call or message, or use the display screen to read/respond to the incoming message and terminate at least temporarily that other function that otherwise occupies the display screen. The present invention is directed toward providing a user with some knowledge relevant to the subject matter between which s/he must choose so that s/he may best determine how the limited display screen of a mobile phone or other portable device is to be used on a message-by-message basis.

SUMMARY

The foregoing and other problems are overcome, and other advantages are realized, in accordance with the presently preferred embodiments of these teachings.

In accordance with an embodiment, the present invention is a method for displaying data on a portable electronic device. In the method, graphical data is displayed on a graphical display, and an event is received at the device that is independent of the graphical data. Responsive to the event, an event type is selected from a list that associates each of at least two event types with one of at least two display formats. A notifier of the event, in the selected format, is then displayed on the graphical display simultaneously with the graphical data.

In accordance with another embodiment, the present invention is a program of machine-readable instructions, tangibly embodied on an information bearing medium and executable by a digital data processor, to perform actions directed toward simultaneously displaying graphical data with a notifier of an event that is unrelated to the graphical data. The actions of the program include determining an event type for an event that is independent of graphical data being displayed at a graphical display screen, then accessing a local storage media to select a display format that is associated with the determined event type. The actions further include displaying on the graphical display screen a notifier of the event, in the selected format, simultaneously with the graphical data.

In accordance with another embodiment, the present invention is a portable electronic device that includes means for receiving graphical data, display means for displaying the graphical data, and means for receiving an event and classifying the received event by type. The device further includes means for associating each of at least two event types with one of a plurality of display formats, and means for adapting the display means to display a notifier of the received event, in the display format associated with the event type, simultaneously with the graphical data.

In certain embodiments, the means for receiving graphical data could be a digital television receiver, a camera, and a local storage media in which a video or image data file (e.g., such as from the camera or the digital television receiver or uploaded to the storage media via a wired or wireless link) or user alarm is stored. In certain embodiments, the means for classifying the event by type includes a computer processor and the means for associating includes a data file in a local storage media of the device coupled to that processor. In certain embodiments, the display means is a graphical display screen such as a flat panel display LCD screen, the means for adapting is a display driver that drives the screen, and the means for receiving an event may be a wireless receiver (e.g., when the event is an incoming call which may be a PoC call, an SMS/IM/MMS message, or an email) and a processor coupled to a local storage media (e.g., when the event is an alarm from a user calendar stored in the local storage media).

In another embodiment, the invention is an electronic device that has a graphical display screen, a processor and display driver, and a local storage media. The graphical display screen is for displaying graphical data. The processor and display driver are coupled to the graphical display screen for providing the graphical data to it. The local storage media is coupled to the processor for storing an association of each of at least two event types with one of at least two display formats. Responsive to the processor receiving an event that is independent of the graphical data being currently displayed, the processor determines an event type of the received event, selects the display format associated with the determined event type, and with the display driver, displays the graphical data on the graphical display screen simultaneously with a notifier of the event in the selected format.

The following detailed description and drawings lay out the invention in further detail and in various embodiments.

BRIEF DESCRIPTION OF THE DRAWINGS

The foregoing and other aspects of these teachings are made more evident in the following Detailed Description of Embodiments of the Invention, when read in conjunction with the attached Drawing Figures, wherein.

DETAILED DESCRIPTION OF EMBODIMENTS OF THE INVENTION

Figures 1A, 1B:
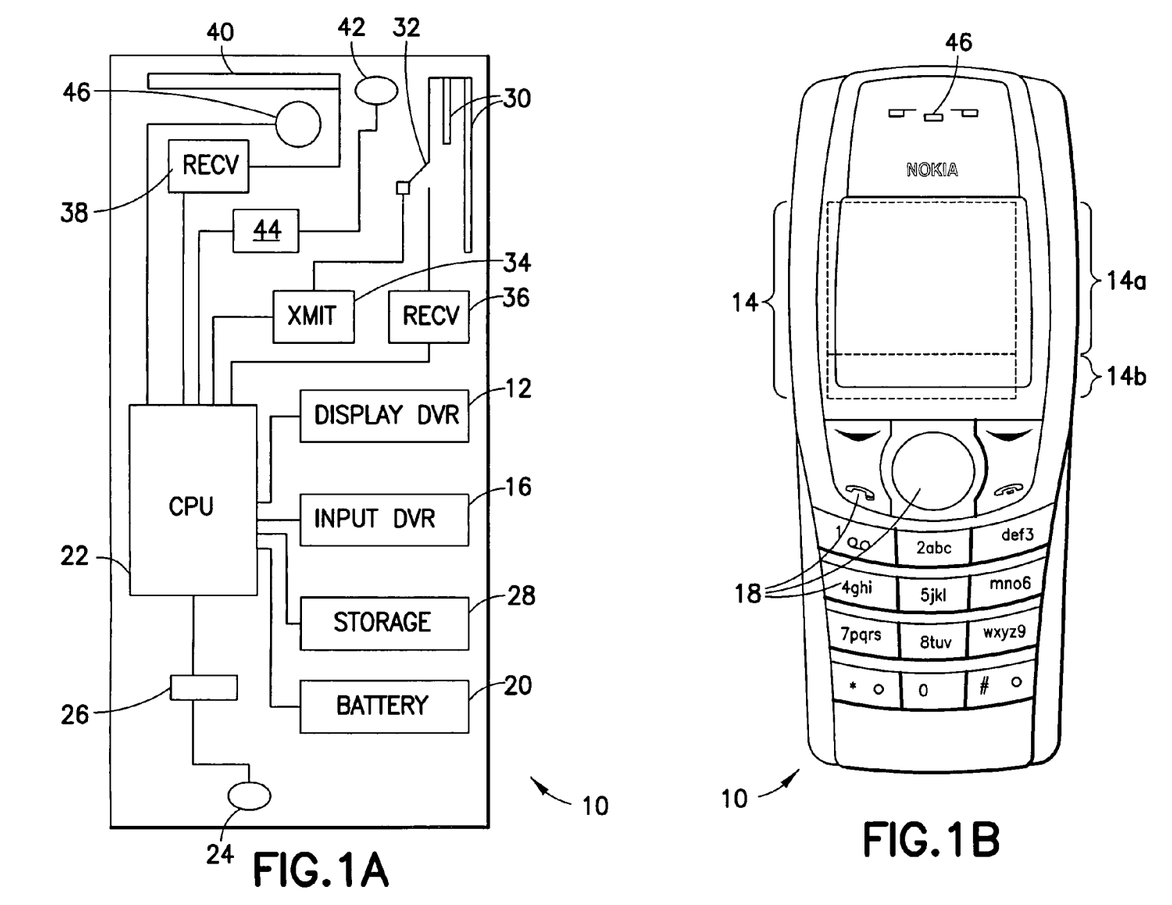
FIG. 1A is a schematic block diagram of a mobile station in which the present invention may be embodied.
FIG. 1B is a plan view of the exterior of the mobile station of FIG. 1A.

FIG. 1A depicts in block schematic form, and FIG. 1B in graphical exterior plan view, a mobile station 10 in which the physical aspects of the present invention may be embodied, or methods according to the present invention may be practiced. A mobile station MS is a handheld portable device that is capable of wirelessly accessing a communication network, such as a mobile telephony network of base stations that are coupled to a publicly switched telephone network. A cellular telephone, a Blackberry® device, and a personal digital assistant (PDA) with Internet or other two-way communication capability are examples of a MS. A portable wireless device includes mobile stations as well as additional handheld devices such as devices that may access only local networks such as a wireless localized area network (WLAN) or a WIFI network.

FIG. 1A illustrates in block diagram form a mobile station MS 10 in which the present invention may preferably be disposed. These blocks are functional and the functions described below may or may not be performed by a single physical entity as described with reference to FIG. 1A. A display driver 12, such as a circuit board for driving a graphical display screen 14, and an input driver 16, such as a unit for receiving inputs from an array of user actuated buttons or joystick at a keypad 18, are provided for interfacing with a user. User inputs may be received at the graphical display screen 14 where such a screen is touch sensitive, and converted at the display driver 12 and/or input driver 16 into electrical signals that are processed within the MS 10. The graphical display screen 14 may be virtually partitioned into a first portion 14a and a second portion 14b, as detailed below and shown in dashed line in FIG. 1B. The MS 10 further includes a power source 20 such as a self-contained battery that provides electrical power to a central processor 22 that controls functions within the MS 10. Within the processor 22 are functions such as digital sampling, decimation, interpolation, encoding and decoding, modulating and demodulating, encrypting and decrypting, spreading and despreading (for a CDMA compatible MS 10), and additional signal processing functions known in the art.

Voice or other aural inputs are received at a microphone 24 that may be coupled to the processor 22 through a voice buffer 26. Audible output from the MS 10 is transduced at a speaker 46. Computer programs such as that described below for the present invention, algorithms to modulate, encode and decode, data arrays such as look-up tables, and the like are stored in a computer readable storage media 28 which may be an electronic or optionally optical or magnetic memory storage media as is known in the art for storing computer readable instructions and programs and data. User data may also be stored in the storage media 28, including contacts with names and phone numbers, personal calendars with alarms, reminders, notes, documents, spreadsheets, archived emails and short messages, and the like. The storage media 28 is typically partitioned into volatile and non-volatile portions, and is commonly dispersed among different storage units, some of which may be removable.

The MS 10 communicates over a network link such as a mobile telephony link via one or more telephony antennas 30 that may be selectively coupled via a transmit/receive T/R switch 32, or a diplex filter, to a first transmitter 34 and a first receiver 36. The MS 10 may additionally have a second receiver 38 for receiving over a separate antenna 40 some sort of non-telephonic data, such as a streaming video signal for digital television or sending and receiving gaming commands to and from another participant in an interactive gaming session. Return communication to the source of the digital television signal is typically via standard mobile telephony hardware using a cellular back channel, whereas interactive gaming is often enabled by a Bluetooth or other personal area network transceiver. The telephony antennas 30 and the separate antenna(s) 40 differ in shape and size to accommodate the different frequencies over which those communications occur. Known antenna types include monopole, di-pole, planar inverted folded antenna PIFA, and others. The various antennas 30, 40 may be mounted externally (e.g., whip) or completely internally of the MS 10 housing. The MS 10 may additionally include (not shown) secondary and tertiary transmitters and receivers for communicating over additional networks, such as a WLAN, WIFI, Bluetooth®, and the like. Alternative to or in addition to the second receiver 38 and separate antenna 40, the MS 10 may include a camera 42 coupled through a video buffer 44 to the processor 22, or gaming software stored at the storage media 28. Increasingly, mobile stations are configured with digital cameras capable of capturing at least short video clips and storing them at the storage media 28 for later reproduction. The graphical display screen 14 may therefore display graphical (video) data from a streaming source received at a separate antenna 40 and second receiver 38, live video being recorded by the MS 10 though the video-enabled camera 42, an archived video file or still photographic image stored at the storage media 28, a framed still image being displayed on the screen 14 but not yet captured by the camera 42, or graphical gaming from a gaming program stored at the storage media 28. These are each considered examples of graphical data that may occupy the display screen 14 in whole or in part, for which a user may or may not desire to be interrupted with an incoming call or message. Other sources of graphical data are not excluded.

An aspect of the invention is that a user, watching graphical data at the display 14, may be informed of another event without interruption of the graphical data being displayed. As most graphical video data includes corresponding audio that is normally transduced at the speaker 46, embodiments of the invention further do not interrupt that audio signal that corresponds to the video signal. Upon the occurrence of an event independent of graphical data being displayed at the graphical display screen 14, a notifier is simultaneously displayed on the screen 14 with the graphical data.

An event independent of the graphical data includes an alarm that a user sets in association with activities that a user enters into a personal calendar/datebook stored within the storage media 28 of the MS 10. The alarm may be selected by the user to relate to a certain activity that the user enters into the calendar, such as the scheduled activity start time, two hours prior to that start time, ten days prior, and the like. Where the event is an alarm, the event is fully within the control of the user. Another event independent of the graphical data is an incoming call over a mobile telephony network. An incoming call is used narrowly herein to include voice calls such as traditional cellular party-to-party calls and push-to-talk over cellular PoC calls that use a walkie-talkie type interface. An incoming call excludes text messaging and other data messages. Incoming messages such as short message service SMS, instant messaging IM, multimedia messages MMS, and emails, even if received over a mobile telephony network, are termed herein as messages. PoC calls may be converted to text once received at the MS 10 and treated thereafter as a data message, but remain incoming calls because they are not data messages as received. Besides the obvious difference once the packets are despread and decoded, the distinction between voice and data (text messages) in a spread spectrum system lies within packet prioritization; voice packets of traditional and PoC calls typically are given higher priority as they are more time sensitive than data packets due to the need to re-assemble them in order once received. Thus, an email carrying an audio file (e.g., as an attachment) is a data message and not an incoming call; its spread spectrum packets will exhibit a lower priority than voice, and those packets may be re-assembled at the destination out of the chronological order of transmission because the audio file cannot be opened until substantially all packets are received. Other events are within the scope of the present invention; the above three events (alarm, incoming call, message) are exemplary and considered different types of events.

Figure 2A:
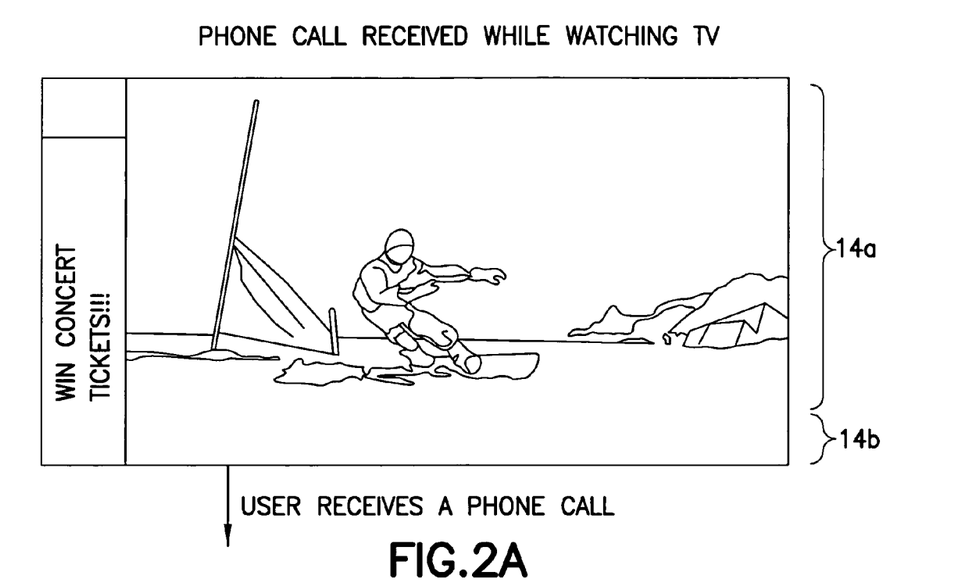
FIG. 2A is a plan view of the graphical display interface of FIGS. 1A-1B displaying only graphical (video) data.

FIGS. 2A-2D illustrate the graphical display screen 14 of the MS 10 as modified by the present invention. FIG. 2A represents an initial condition: the video data (from whatever source) is being displayed across substantially the entirety of the screen 14. Advertisements such as that shown to the left side of the graphical display screen 14 of FIG. 2A form part of the received video signal where the graphical data is streaming digital television as in FIGS. 2A-2D. Of course, FIGS. 2A-2D illustrate only one of several styles of how a graphical display screen 1 might display data. Whereas FIGS. 2A-2D illustrate a "full screen" mode, the graphical data may readily be displayed in a normal or other display mode.

Figure 2B:
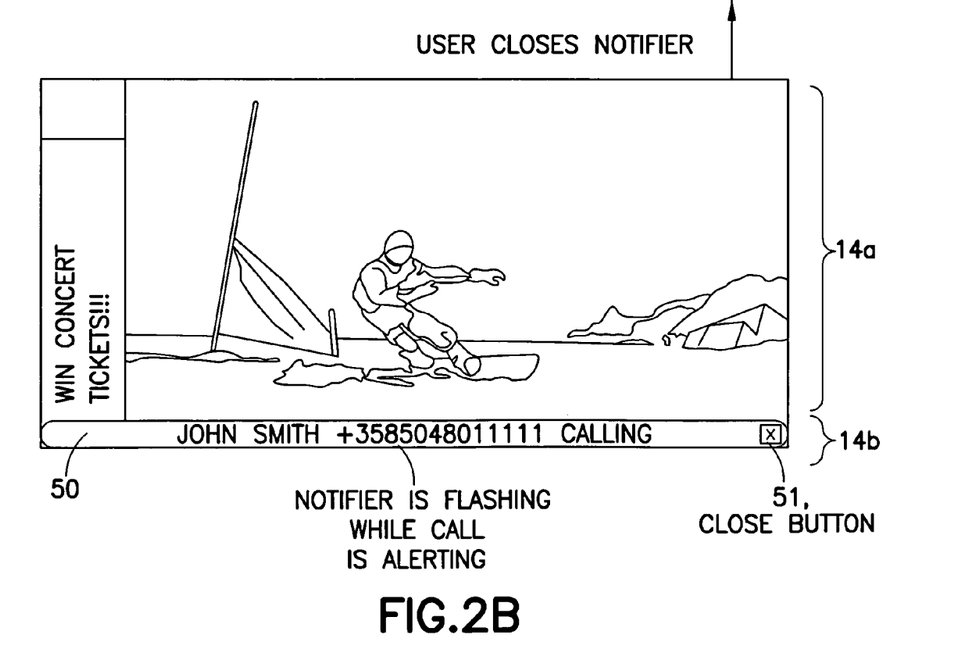
FIG. 2B is a plan view of the graphical display interface of FIGS. 1A-1B displaying video data alongside a first set of event data.

FIG. 2B illustrates the graphical display screen 14 according to an embodiment of the invention when a call is incoming to the MS 10 while graphical data is being displayed. As viewed by the user, the graphical data is confined to a first portion 14a of the graphical display screen 14 and an incoming call event notifier 50 is displayed at a second portion 14b of that same display screen 14. The first and second portions 14a, 14b may be in any number of relative locations, shapes, and sizes (side by side, above and below, the second portion along a margin of the first portion in a normal display mode, mating shapes, etc.) As depicted, the incoming call event notifier 50 is merely superimposed to obscure a portion of the video data, and the remaining display at the first portion 14a is unaffected by the event notifier 50. Alternatively, the graphical data may be compressed so that the entire field previously displayed (at FIG. 2A) over the entirety of the graphical display screen 14 is now displayed only in the first portion 14b, albeit with slightly reduced resolution. Where the event notifier 50 spans the breadth of the screen 14 as in FIGS. 2B-2D, the latter option above would also require re-configuring the graphical data feed as displayed to a different aspect ratio to completely fill the first portion 14a of the screen 14. This option is not seen as preferred at the present time due the undue drain on the portable power supply of a portable device that such reconfiguring of the graphical data signal would entail.

While an incoming call is active, preferably the incoming call event notifier 50 flashes to more effectively distinguish the identifier 50 from the graphical data being watched at the first portion 14a. Once the incoming call is no longer active (e.g., the caller is electronically directed to a voicemail option, the link between caller and the receiving MS 10 is disconnected, etc.), the incoming call event notifier 50 stops flashing and may change to read a summary only, such as "1 missed call". If at any time (incoming call or missed call) the user chooses not to continue viewing the event notifier 50, s/he merely uses the keypad 18, preferably a joystick, glide pad, or other functional equivalent, to select a close button 51 which closes the event the notifier from the second portion 14b of the display 14, returning the display to that illustrated at FIG. 2B.

Figure 2C:
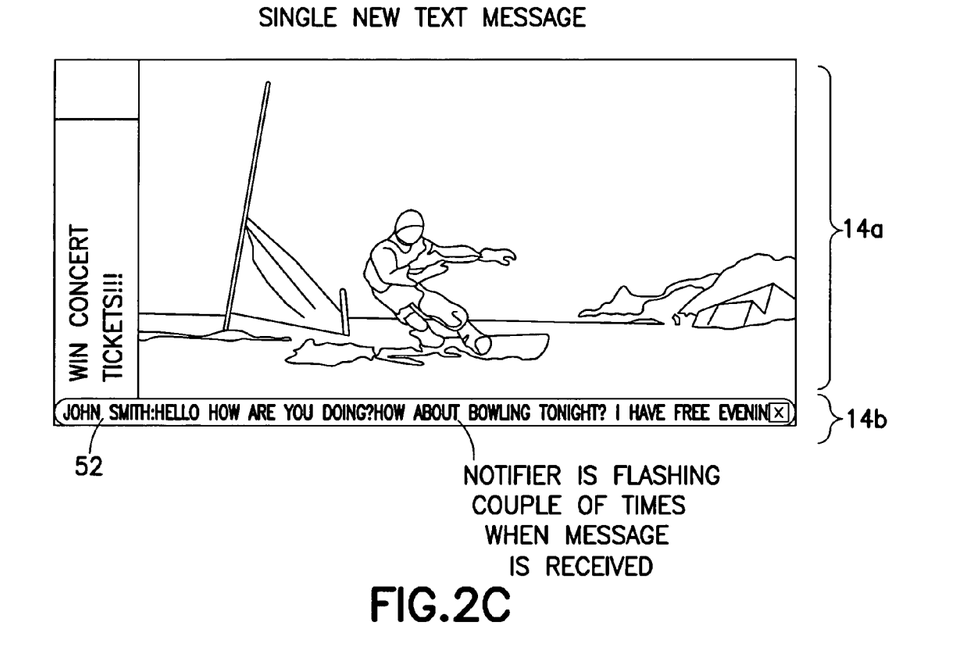
FIG. 2C is a plan view of the graphical display interface of FIGS. 1A-1B displaying graphical (video) data alongside a second set of event data.

FIG. 2C illustrates the graphical data being displayed at the first portion 14a of the screen 14 alongside a text message notifier 52 displayed at the second portion 14b. The text message notifier 52 displays text specific to the received message, which in FIG. 2C is a short message service SMS message. While certainly possible from a technical perspective, it is not currently deemed as a preferable embodiment to display text specific to a received email where the event is an incoming email, as email accounts are often subject to SPAM and users generally prefer to filter received emails by their subject line prior to opening and reading text specific to each email. Thus, there may be a different format for displaying a notifier of an SMS message as compared to an email message. Similar to the distinction between voice and data detailed above, the distinction between SMS and other data is readily determined by the packet arrangement even before the data content of the various packets are despread decoded.

Figure 2D:
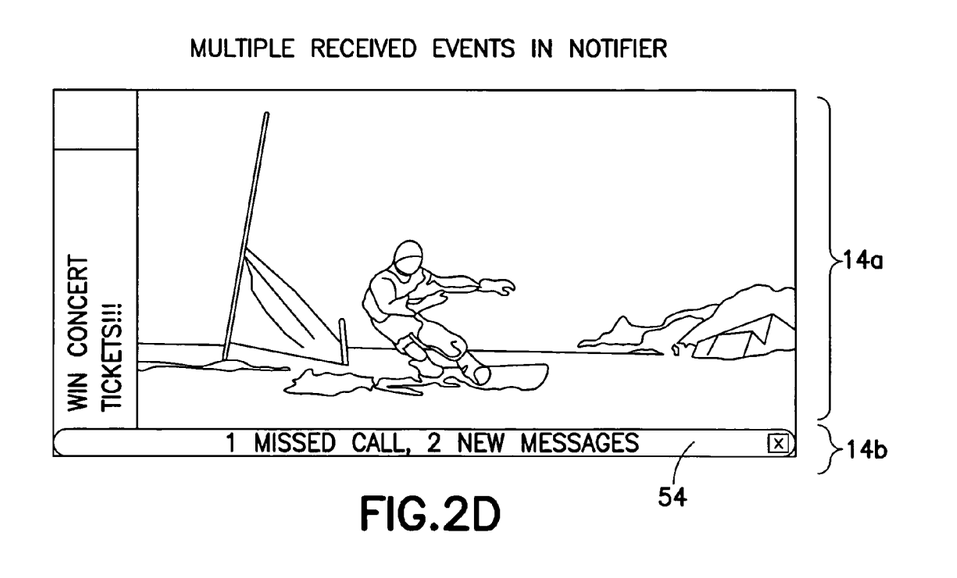
FIG. 2D is a plan view of the graphical display interface of FIGS. 1A-1B displaying video data alongside a summary of multiple event data.

FIG. 2D illustrates the graphical data being displayed at the first portion 14a of the screen 14 alongside a summary message notifier 54 displayed at the second portion 14b. The summary message notifier 54 displays a summary of a plurality of event for which a user of the MS 10 has not acknowledged through the keypad 18 or other input means. For example, a user can acknowledge an incoming call by answering it, an incoming SMS message by responding or deleting it or closing the link to the sender, and an email message by opening the entire email message to view the text. Selecting the close button 51 may in some embodiments serve as an acknowledgement of the event (or events in the summary message notifier 54), or in other embodiments may serve merely to change the display at the screen 14 without acknowledging an event. Where two or more such events remain un-acknowledged, the summary message notifier 54 displays a number and type of each un-acknowledged event as illustrated in FIG. 2D. Preferably, where such a summary event notifier 54 is displayed and a new event is received, the second portion 14b of the screen 14 displays a notifier for the new event. If that new event is also un-acknowledged, after a time the summary event notifier 54 is again displayed as updated with the un-acknowledged new event.

Figure 3:
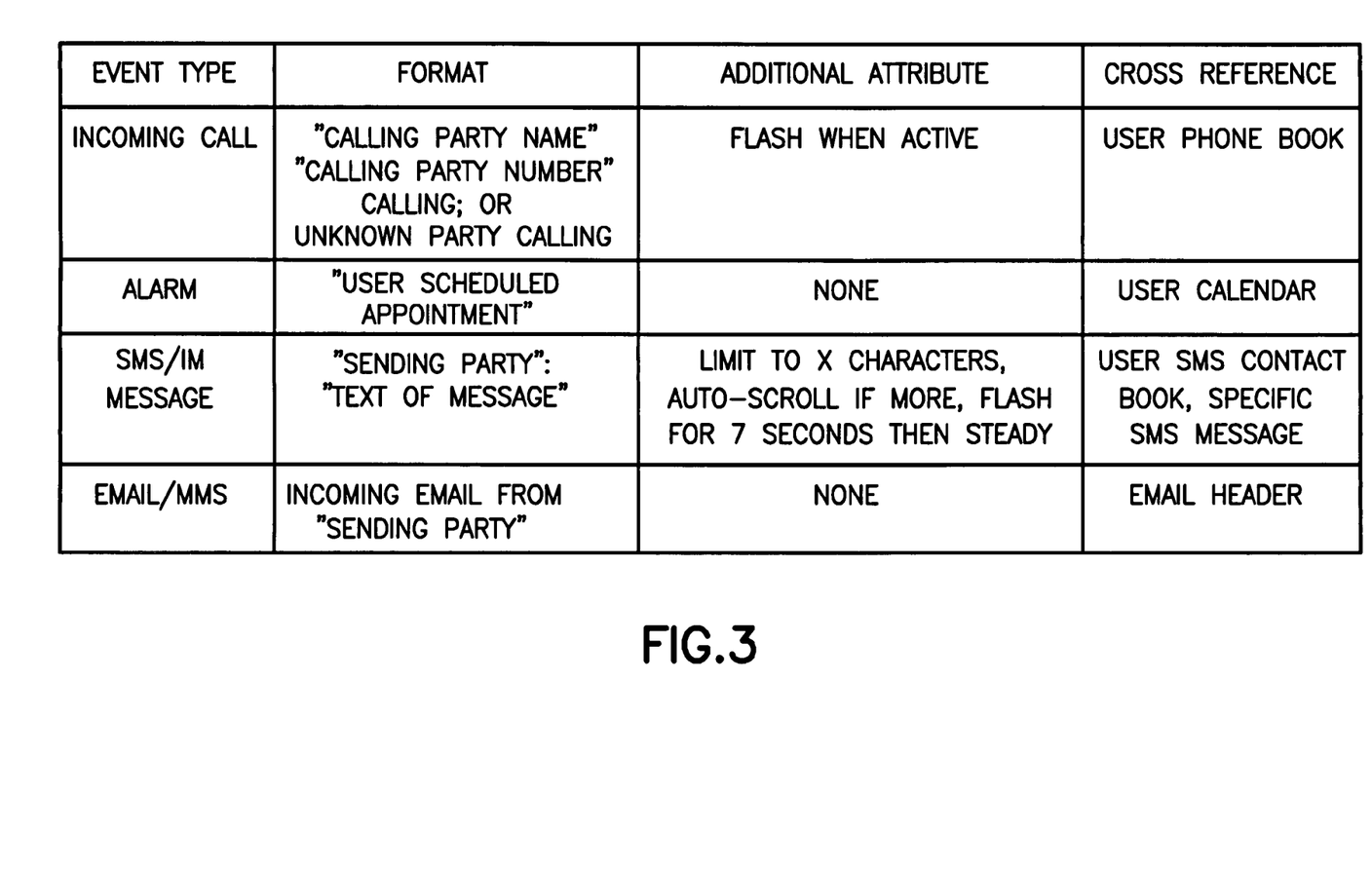
FIG. 3 is a table showing an association of event type with display format according to the present invention, which may be stored in a storage media of the mobile station of FIGS. 1A-B.

It is clear from the above that the format of the event notifier displayed at the screen 14 depends from the type of message received. FIG. 3 illustrates a table/list of different event types each associated with a display format, where the formats track those illustrated in FIGS. 2B-2D as exemplary formats. Four event types previously detailed are listed. Italicized entries in the "Format" column indicate text that is to be taken from another source, such as those listed in the "Cross reference" column. Additional attribute relates to aspects of the event notifier displayed at the screen 14 other than text.

As an example and as previously described, an event of the incoming (phone) call type displays in the format described in the horizontal row associated with that type. The receiving MS 10 determines that the event is an incoming call, and the phone number from which the incoming call was placed. In certain mobile networks, the phone number from which the incoming call was placed may be an initiating phone number or a forwarding number that relays the incoming call to the receiving MS 10. The MS 10 then accesses its local storage media 28. In the case where the phone number from which the incoming call was placed is within a user phone book in the local storage media 28, the calling party name from that phone book, entered at some previous time by a user of the MS 10, is displayed along with the calling party number (from the phone book or from the incoming call; that a name is returned form the phone book means they match) and a generic text "calling" common to all event types displayed with this format. In the case where the MS 10 finds no match to the phone number of the incoming call, only a non-specific text may be displayed such as "Unknown party" preceding the generic text "calling" that replaces the variable "calling party name" (and possibly "calling party number" if the number is blocked) if no match is found in the phone book. Though not illustrated, an icon such as a small graphic of a telephone may be displayed at the second portion 14b and animated for an incoming call event. Such icon would be identified in the list of FIG. 3. A PoC call may be displayed similar to the traditional incoming phone call as above and in FIG. 2B, or may be converted to text within the MS 10 and displayed as a data message such as in FIG. 2C.

Similarly, when the MS 10 recognizes an event as an alarm from a user calendar stored in the local storage media 28, the event type is accessed in the list of FIG. 3 and the format is determined, in this case displaying the entry made in the calendar by the user to which the alarm relates. Additional specific text may also be displayed, such as the date and time that the user does not enter in the calendar as text per se. An icon may also be displayed.

Where the MS 10 recognizes an event as an incoming/received SMS or instant messaging IM message, the second portion 14b of the display screen 14 may show the SMS/IM message sender's name "sending party" directly from that SMS/IM message or from a SMS/IM contact book locally stored in the storage media 28, similar to that described above for the user phone book. For an SMS/IM message type, the actual text of the SMS/IM message is also displayed following the sender's name. Preferably, the second portion 14b of the display screen 14 is size limited so that the video data is only minimally diminished when an event notifier is displayed. The result is then that a SMS/IM message may be too long to display, and the format for an event of the type SMS/IM message will be character limited to fit that limited size. Where the SMS/IM message text is longer than the limit of X characters, the additional attribute is to automatically scroll the text of the SMS/IM message until the entire text has been displayed at the second portion 14b. An SMS/IM-specific icon may also be displayed.

Where the MS 10 recognizes an event as the type incoming or received email, preferably the format is to display only the sender's email address and possibly the email header line from the content of the email itself, for reasons detailed above. It is noted that the display of the sender's email address may be the actual URL address (e.g., bob4752@comcast.net) or a user selected display name (e.g., Bob Smith) within the email header itself. An email icon may also be displayed.

The format for displaying a summary of events not acknowledged by the user of the MS 10 may conveniently also be stored with the list of FIG. 3.

Once the event notifier is displayed in the format matching the event type, the display of the notifier may change in any number of ways deemed to suit a user. For example, the event notifier may automatically close (the function of button 51) if not acknowledged within a certain time period, flashing of the second portion 14b of the screen (either background, text, icon, or some combination) may proceed for a time and terminate, and the like.

The user may have the option to override the display of the notifiers 50, 52, 54 and instead be warned via an audible signal from the speaker 46. Similar to the different message types, a different audible signal may identify each different message type, or a single audible signal may be used for any message type. Such an alternative would be embodied in FIG. 3 as a separate column of audible signal entries, each corresponding to one message type and each executable when the audible, non-display option is selected by a user of the MS 10. Such audible signals may also sound in conjunction with the display of the notifiers 50, 52, 54 at the screen 14.

Clearly, the present invention may be embodied as a computer program stored in the storage memory 28 of the MS 10. Such a computer program would display video data at a graphical display screen 14. Responsive to an event that is independent of the video data, the program would determine an event type for the event. The manner of determining as between events received over a cellular network (e.g., incoming call, SMS message, email) is noted above and known in the art. The program then selects a display format associated with the event type. Preferably, the association such as shown in FIG. 3 is stored as part of the program in the storage media 28. The program then displays on the graphical display screen 14 and simultaneously with the video data, a notifier 50, 52, 54 of the event in the selected format.

Although described in the context of particular embodiments, it will be apparent to those skilled in the art that a number of modifications and various changes to these teachings may occur. Thus, while the invention has been particularly shown and described with respect to several embodiments thereof, it will be understood by those skilled in the art that certain modifications or changes may be made therein without departing from the scope and spirit of the invention as set forth above, or from the scope of the ensuing claims.

What is claimed is:

1. A method comprising:
    displaying graphical data on a graphical display of a portable electronic device;
    responsive to an occurrence of an event that is independent of the graphical data,
    automatically selecting a corresponding event type from a list comprising a plurality of different event types each having an associated display format, the list being stored in a memory of the portable electronic device; and
    displaying the graphical data on the graphical display simultaneously with a notifier of the occurrence of the event using the display format associated with the selected corresponding event type;
    wherein the plurality of different event types comprise at least one of:
        an incoming call event, in which the display format associated with the incoming call event comprises displaying a calling party identifier for the case where a calling party number of the incoming call event is matched to the calling party identifier in the memory;

an incoming message event, in which the display format associated with the incoming message event comprises displaying at least a portion of text specific to the message; and an alarm event of a user calendar, in which the display format associated with the alarm event comprises displaying a text for the alarm event and the user calendar is stored in the memory.

2. The method of claim 1, wherein the plurality of different event types comprises at least the alarm event.

3. The method of claim 1, wherein the device comprises a mobile station and the plurality of different event types comprises at least the incoming call event.

4. The method of claim 3, wherein the notifier flashes at least during a time when the incoming call may be received by a user.

5. The method of claim 1, wherein the device comprises a mobile station and the plurality of different event types comprises at least the incoming message event, in which the incoming message event comprises at least one of a short message service message, an instant message, or an e-mail message.

6. The method of claim 5, wherein the notifier automatically scrolls to display the entire message text.

7. The method of claim 1, wherein the graphical data comprises video data received over a wireless link and displayed in real time, stored in a storage media of the device, or fed from a camera framing a scene.

8. The method of claim 1, wherein the graphical data comprises computer gaming data at least partially stored on a storage media of the device.

9. The method of claim 1, wherein displaying the graphical data on the graphical display simultaneously with the notifier comprises displaying the graphical data at a first portion of the graphical display and displaying the notifier at a second portion of the graphical display.

10. The method of claim 1, wherein displaying the graphical data on the graphical display simultaneously with the notifier comprises displaying the notifier superimposed over a portion of the graphical data.

11. The method of claim 1, further comprising:
responsive to a plurality of said events to which a user acknowledgement has not been received, displaying the graphical data on the graphical display simultaneously with a notifier that summarizes the plurality of events.

12. The method of claim 1 wherein the plurality of different event types comprises at least the incoming call event and the incoming message event.

13. The method of claim 1 wherein the display format associated with the incoming call event comprises flashing the notifier of the incoming call event only while the incoming call is active.

14. A program of machine-readable instructions, tangibly embodied on an information bearing medium and executable by a digital data processor, to perform actions comprising:
displaying graphical data at a graphical display screen of a device;
responsive to an occurrence of an event that is independent of the graphical data, determining an event type for the event and automatically selecting a corresponding event type from a list comprising a plurality of different event types each having an associated display format, the list being stored in a local storage media of the device; and
displaying on the graphical display screen a notifier of the occurrence of the event simultaneously with the graphical data, the notifier being displayed using the display format associated with the selected corresponding event type;

wherein the plurality of different event types comprise at least one of:
an incoming call event, in which the display format associated with the incoming call event comprises displaying a calling party identifier for the case where a calling party number of the incoming call event is matched to the calling party identifier in the local storage media;
an incoming message event, in which the display format associated with the incoming message event comprises displaying at least a portion of text specific to the message; and
an alarm event of a user calendar, in which the display format associated with the alarm event comprises displaying a text for the alarm event and the user calendar is stored in the local storage media.

15. The program of claim 14, wherein the plurality of different event types comprises at least the incoming call event and the incoming message event, in which the incoming message event comprises at least one of an incoming instant message or multimedia message or short message service message or e-mail message.

16. The program of claim 14, wherein the information bearing medium is disposed within a mobile station.

17. The program of claim 14, wherein displaying the graphical data on the graphical display screen simultaneously with the notifier comprises displaying the graphical data at a first portion of the graphical display screen and displaying the notifier at a second portion of the graphical display screen.

18. The program of claim 14, wherein the actions further comprise:
responsive to a plurality of said events to which a user acknowledgement has not been received, displaying on the graphical display screen a notifier of the said plurality of events in a summary format simultaneously with the graphical data.

19. An apparatus, comprising:
means for receiving graphical data;
display means for displaying the graphical data;
means for detecting an occurrence of an event and classifying the event by type;
means for automatically selecting a corresponding event type from a table comprising a plurality of different event types each having an associated display format, the table being stored in a local storage media of the apparatus; and
means for adapting the display means to display a notifier of the occurrence of the event, in the display format associated with the selected corresponding event type, simultaneously with the graphical data; where
said table includes, for at least one event type, a cross-reference to stored information related to the at least one event type, and where said means for adapting causes the display means to also display at least a portion of the stored information in conjunction with the display of the notifier;

wherein the plurality of different event types comprise at least one of;
an incoming call event, in which the display format associated with the incoming call event comprises displaying a calling party identifier for the case where a calling party number of the incoming call event is matched to the calling party identifier in the local storage media and the stored information comprises a user phone book;

an incoming message event, in which the display format associated with the incoming message event comprises displaying at least a portion of text specific to the incoming message event; and an alarm event of a user calendar, in which the display format associated with the alarm event comprises displaying a text for the alarm event and the stored information comprises the text for the alarm event from the user calendar.

20. The apparatus of claim 19, wherein:

the means for receiving graphical data comprises at least one of a digital television receiver, a camera, and the local storage media;

the means for detecting and classifying the event by type comprises a processor coupled to the local storage media and to a wireless receiver; and the means for adapting comprises a display driver for the display means.

21. An apparatus comprising:

a graphical display screen configured to display graphical data;

a processor and a display driver coupled to the graphical display screen configured to provide the graphical data; and a local storage media configured to store a table comprising a plurality of different event types each having an associated display format; wherein the processor is further configured to respond to an occurrence of an event that is independent of the graphical data and to determine an event type of the event, select from the table the display format associated with the determined event type, and with the display driver, display the graphical data on the graphical display screen simultaneously with a notifier of the occurrence of the event using the display format selected from the table;

wherein the plurality of different event types comprise at least one of:

an incoming call event, in which the display format associated with the incoming call event comprises displaying a calling party identifier for the case where a calling party number of the incoming call event is matched to the calling party identifier in the local storage media;

an incoming message event, in which the display format associated with the incoming message event comprises displaying at least a portion of text specific to the incoming message event; and an alarm event of a user calendar, in which the display format associated with the alarm event comprises displaying a text for the alarm event.

22. The apparatus of claim 21 comprising a mobile station that further comprises a wireless receiver, wherein the plurality of event types comprise two or more of the incoming call event and the incoming message event, wherein the incoming message event comprises at least one of an e-mail message, a short message service message and an instant message.

23. The apparatus of claim 21 wherein one of the plurality of event types comprises the alarm event of the user calendar.

24. The apparatus of claim 21, wherein the processor and the display driver are further configured, responsive to an occurrence of a plurality of said events to which a user acknowledgement has not been received at a user input of the apparatus, to display the graphical data on the graphical display simultaneously with a notifier that summarizes the plurality of events.

* * * * *